(12) United States Patent
Brosnan et al.

(10) Patent No.: US 7,063,617 B2
(45) Date of Patent: Jun. 20, 2006

(54) WINS OF RESTRICTED CREDITS IN A GAMING MACHINE

(75) Inventors: William R. Brosnan, Reno, NV (US); Bryan D. Wolf, Reno, NV (US); Steven G. LeMay, Reno, NV (US)

(73) Assignee: IGT, Reno, NV (US)

( * ) Notice: Subject to any disclaimer, the term of this patent is extended or adjusted under 35 U.S.C. 154(b) by 460 days.

(21) Appl. No.: 10/082,911

(22) Filed: Feb. 25, 2002

(65) Prior Publication Data
US 2003/0162588 A1 Aug. 28, 2003

(51) Int. Cl.
*A63F 13/00* (2006.01)

(52) U.S. Cl. .......................... 463/25; 463/42
(58) Field of Classification Search ............ 463/25–28, 463/30, 40, 42, 43
See application file for complete search history.

(56) References Cited

U.S. PATENT DOCUMENTS

| 5,470,079 | A | * | 11/1995 | LeStrange et al. | ............ 463/25 |
| 5,559,312 | A | | 9/1996 | Lucero | |
| 5,575,374 | A | | 11/1996 | Orus et al. | |
| 5,816,918 | A | * | 10/1998 | Kelly et al. | .................... 463/16 |
| 5,941,771 | A | | 8/1999 | Haste et al. | |
| 6,048,269 | A | | 4/2000 | Burns et al. | |
| 6,113,098 | A | | 9/2000 | Adams | |
| 6,227,972 | B1 | | 5/2001 | Walker et al. | |
| 6,371,852 | B1 | | 4/2002 | Acres | |
| 6,443,452 | B1 | | 9/2002 | Brune | |
| 6,511,377 | B1 | * | 1/2003 | Weiss | .......................... 463/25 |
| 2001/0007828 | A1 | | 7/2001 | Walker et al. | |
| 2001/0034266 | A1 | | 10/2001 | Saunders | |
| 2002/0077173 | A1 | * | 6/2002 | Luciano et al. | ............... 463/25 |
| 2003/0008707 | A1 | * | 1/2003 | Walker et al. | ............... 463/25 |
| 2003/0083943 | A1 | * | 5/2003 | Adams et al. | ................ 705/14 |
| 2003/0092477 | A1 | * | 5/2003 | Luciano et al. | ............... 463/16 |
| 2003/0153377 | A1 | * | 8/2003 | Lisowski, Sr. | ............... 463/13 |

FOREIGN PATENT DOCUMENTS

WO    WO 02/23491 A2    2/2002

\* cited by examiner

*Primary Examiner*—Kim Nguyen
(74) *Attorney, Agent, or Firm*—Beyer, Weaver & Thomas LLP (57) ABSTRACT

Disclosed is a gaming system and method designed or configured to provide wins of restricted credits. Restricted credits may be awarded according to the same or a different pay table than cashable credits on the same machine or at the same gaming property. Where separate pay tables are used for restricted and cashable credits, the invention may be implemented with a machine that accepts and pays only restricted credit according to a single, fixed internal payout schedule ("pay table"). Alternatively, the invention may be implemented with a machine that pays restricted credit according to one fixed internal pay table and cashable credit according to another fixed internal pay table. Or, a machine may pay restricted credit according to an external pay table provided by a host system to which the machine is connected.

29 Claims, 4 Drawing Sheets

WINS OF RESTRICTED CREDITS IN A GAMING MACHINE

BACKGROUND OF THE INVENTION

This invention relates to game playing services for gaming machines such as slot machines and video poker machines. More particularly, the present invention relates to systems and methods enabling able wins of restricted credit on gaming machines.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional method of dispensing coins or tokens as awards for winning game outcomes is being supplemented by ticket dispensers which print ticket vouchers that may be exchanged for cash or accepted as credit of indicia in other gaming machines for additional game play. An award ticket system, which allows award ticket vouchers to be dispensed and utilized by other gaming machines, increases the operational efficiency of maintaining a gaming machine and simplifies the player pay out process. An example of an award ticket system is the EZ PAY ticket system by International Game Technology of Reno, Nev. Award ticket systems and systems using other cashless mediums are referred to as cashless systems.

Cashless systems, such as the EZ PAY ticket system, provide advantages to both game players and casino operators. For example, many players find it more convenient to carry an award ticket than a large number of coins. For gaming machine operators cashless systems tend to reduce gaming machine operating costs. For example, the infrastructure needed to remove and count indicia of credit (e.g. coins, tokens, bills) from the gaming machine may be eliminated or minimized when it is replaced with a cashless system, which reduces the gaming machine operating costs. Further, coin dust, which is potentially damaging to the components of the gaming machine (e.g. electronic components) may be eliminated or minimized when coin acceptors are replaced with the cashless system. Currently, cashless systems have become very popular and have been embraced by customers. For example, ticket vouchers that are generated upon cash-out and redeemed for cash or gaming machine credits within a particular casino are well accepted by game players.

Many gaming systems support player credits more than one type. "Cashable" credits are redeemable for cash for the full face value of the cashless gaming instrument (e.g., ticket or voucher). "Restricted" credits are not directly redeemable for cash for the full face value of the cashless gaming instrument. Restricted credits may be, for example, non-cashable, that is, not redeemable for cash, but only playable on a gaming machine that supports the cashless system in which the instrument (voucher) was issued. Other examples of restricted credits are credits that are redeemable for prizes, or for cash at a discount from the instrument's face value. Restricted credit vouchers are sometimes issued to players in a casino as an incentive to further play, for example. Currently, restricted credit is only available via electronic funds transfer (EFT) or as promotional vouchers and gaming machines have a fixed payout schedule (pay table) that generates cashable credits from winning game play.

Thus, as players play a gaming machine, they win cash, cashable credits or prizes based on a fixed payout schedule. Players may typically collect their credits won as cash at any time between games. Some host systems to which gaming machines are connected are capable of giving players restricted credits on a gaming machine via an electronic funds transfer (EFT). Also, as noted above, a casino operator may manually issue restricted credit vouchers (commonly known as promotional credits) to a player. Typically, these non-cashable restricted credits that players must play on compatible gaming machines and cannot collect as cash. As players wager this type of credit, the gaming machine typically awards cashable credits for wins.

In some cases, a machine may issue free games or plays, however, such free games are not credits and are limited to play on the issuing machine during the current playing session.

It would be desirable to expand the options available for the use of restricted credit in a gaming system to enhance the gaming experience for players and facilitate operations for gaming machine operators.

SUMMARY OF THE INVENTION

This invention addresses the needs indicated above by providing a gaming machine, system and method designed or configured to provide wins of restricted credits. Restricted credits may be awarded according to the same or a different pay table than cashable credits on the same machine or at the same gaming property. Where separate pay tables are used for restricted and cashable credits, the invention may be implemented with a machine that accepts and pays only restricted credits according to a single, fixed internal payout schedule ("pay table"). Alternatively, the invention may be implemented with a machine that pays restricted credits according to one fixed internal pay table and cashable credit according to another fixed internal pay table. Or, a machine may pay restricted credit according to an external pay table provided by a host system to which the machine is connected. Mixed credit wins (wins of combinations of credit types (e.g., restricted and cashable) may also be provided.

Among the advantages of the invention are that it allows for restricted credit winnings that can be recorded on a voucher and played on any machine accepting the restricted credit vouchers at any time. In addition, pay schedules that can return a higher percentage to the player are possible, thereby encouraging further play, without increasing the financial liability for the game machine operator. Further, the gaming machine may be designed or configured to account for different credit internally, externally, or combinations thereof, so that the invention also allows a gaming machine operator to obtain the benefits of offering restricted credits whether or not the gaming machine is connected to a host system (which is capable of EFT).

One aspect of the present invention provides a gaming machine. The gaming machine includes an intelligent device designed or configured to control a game play sequence comprising a presentation of one or more games on the gaming machine, and a memory storing logic causing the intelligent device to award wins of restricted credits to a player based on a game outcome.

Another aspect of the present invention provides, in a gaming machine, a method of awarding wins of restricted credits. The method involves receiving a player wager on a game, conducting the game, and awarding a win of restricted credits based on the game outcome.

Another aspect of the present invention provides a method for increasing a player's winning percentage on a gaming machine without increasing the financial liability of the gaming machine owner by awarding the player wins of restricted credits for play on the gaming machine.

These and other features and advantages of the present invention are described below with reference to the drawings.

DETAILED DESCRIPTION OF SPECIFIC EMBODIMENTS

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
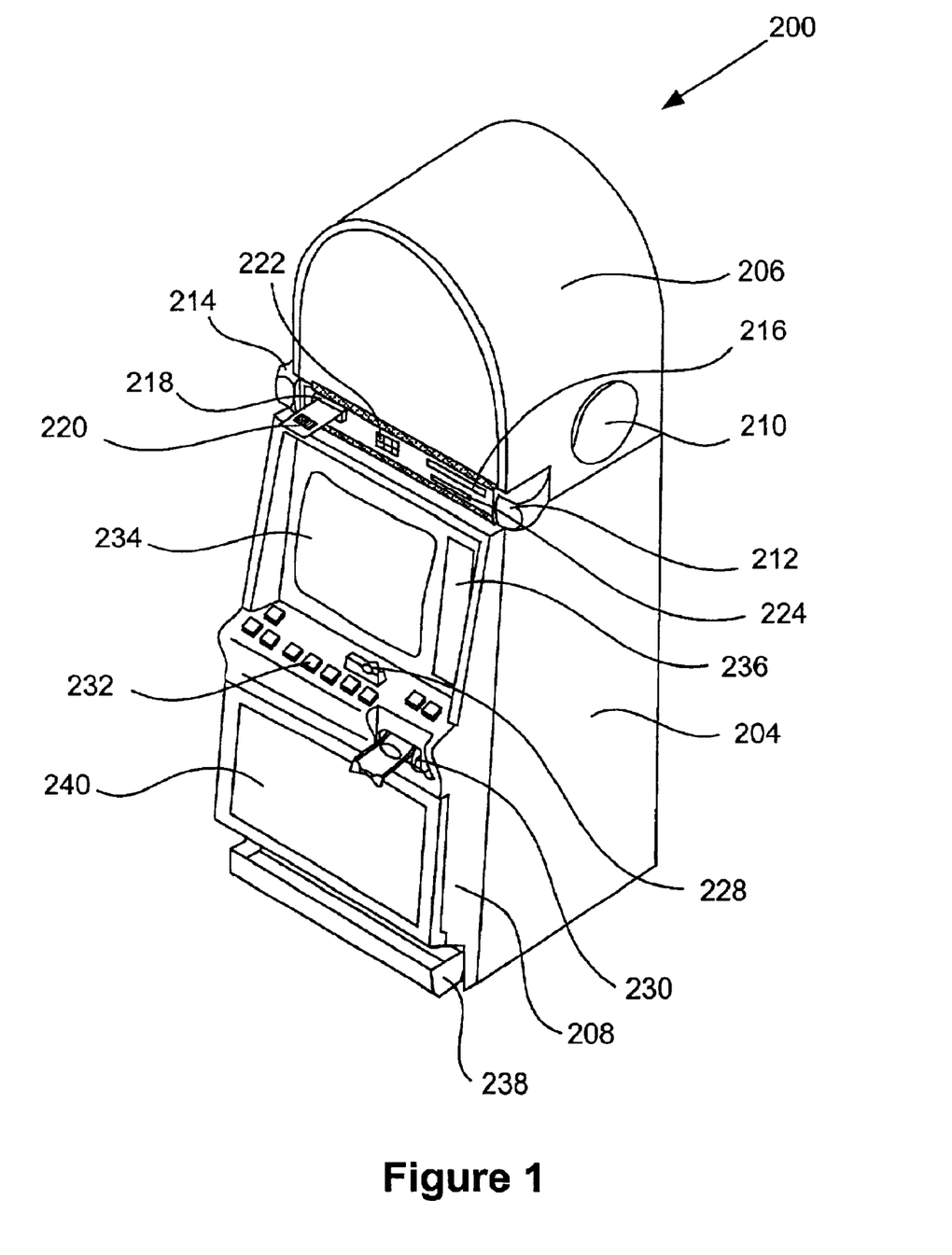
FIG. 1 is a perspective drawing of a gaming machine having a top box and other devices.
Figure 2:
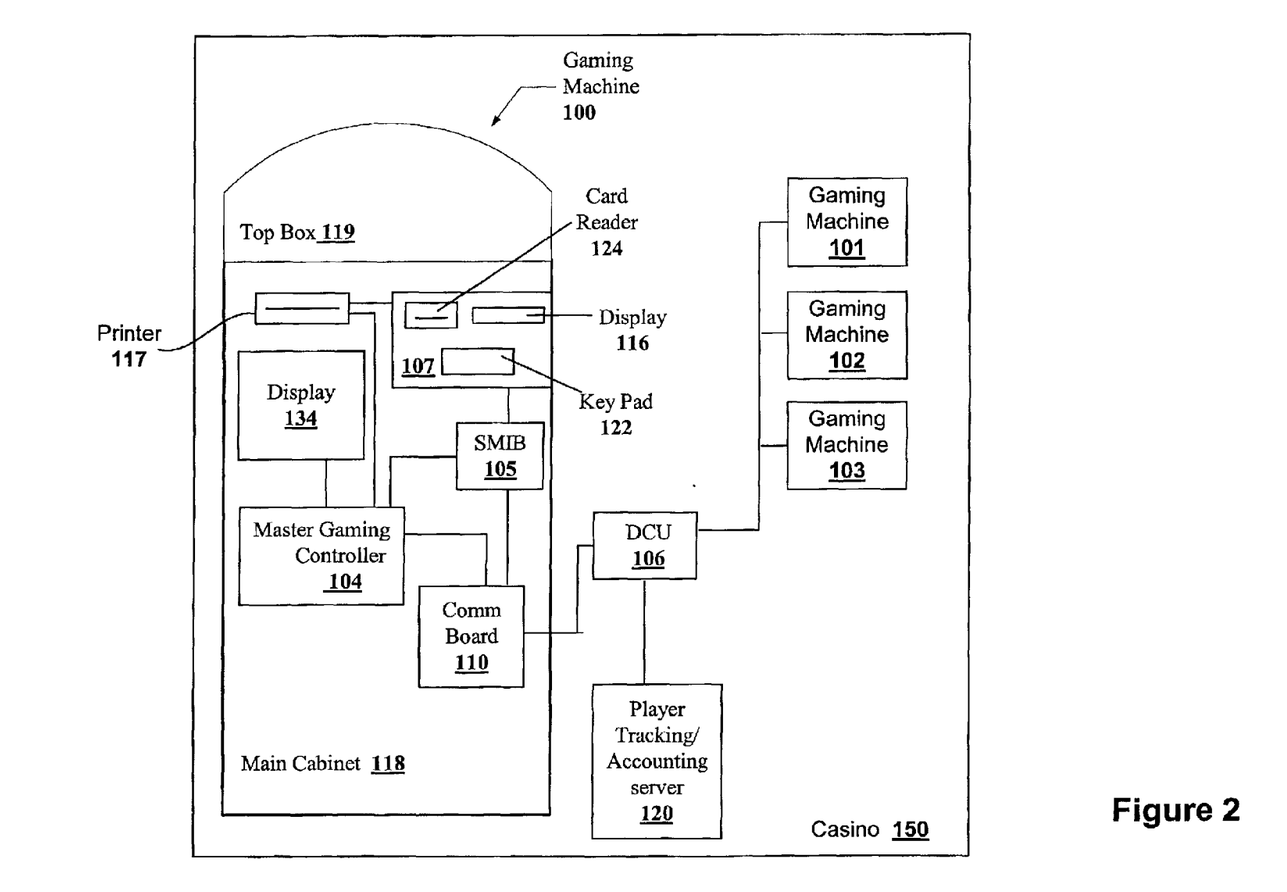
FIG. 2 is a block diagram of a number of gaming machines connected to servers providing associated services, such as accounting and player tracking.
Figure 3:
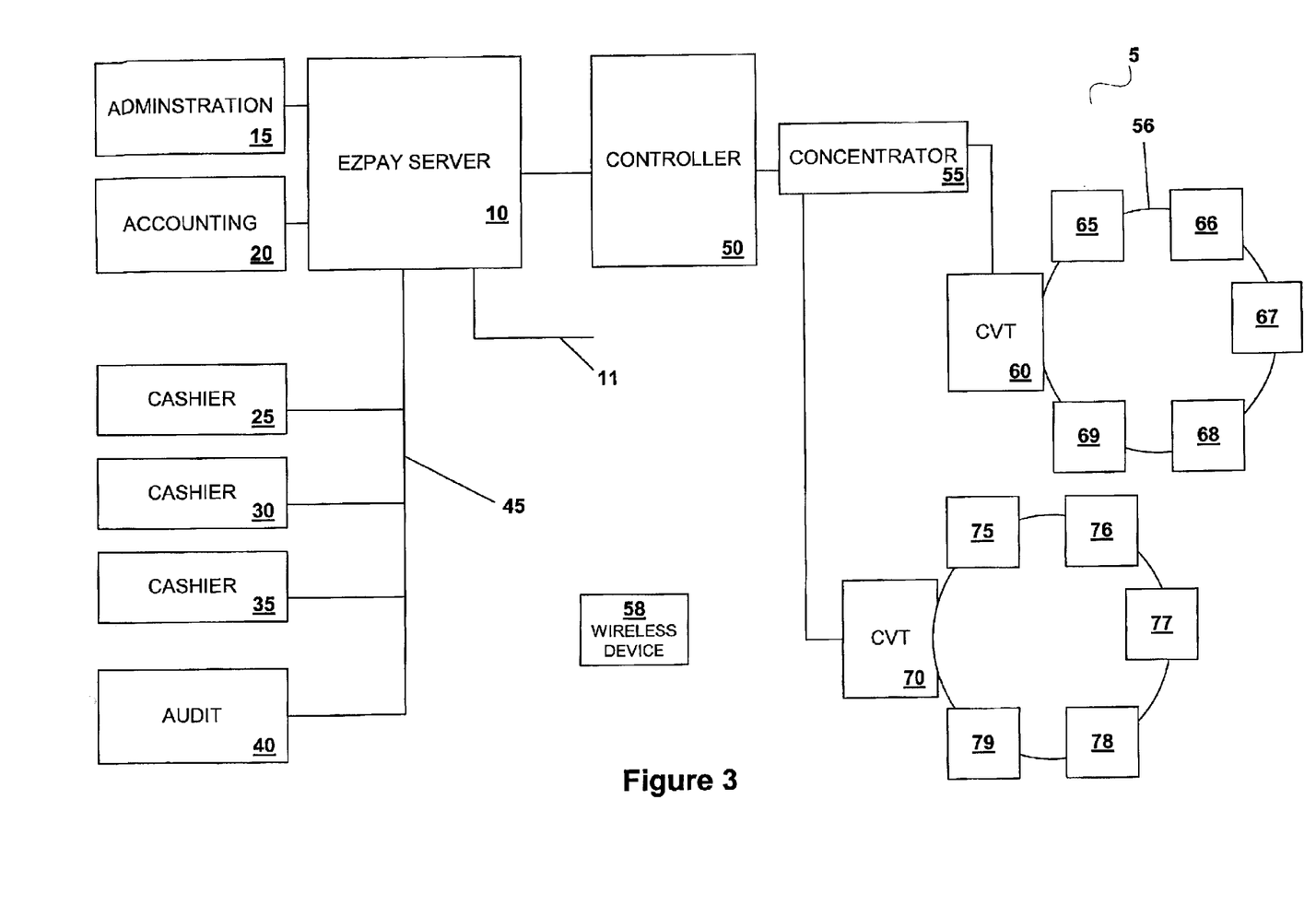
FIG. 3 is a block diagram of the components of a cashless system using the EZ PAY ticket voucher system.

The present invention is implemented on a gaming machine. The gaming machine may be a stand-alone device, or it may be a system of gaming machines and/or supporting devices interconnected via a host system. Such machines and systems and their components are well known in the gaming art. FIGS. 1, 2 and 3, and the associated description that follows below provide pertinent details of such machines and systems suitable for implementation of the present invention. The invention is then described with reference to such machines and systems and a flow chart in FIG. 4.

Gaming Machines and Systems

FIG. 1 illustrates a video gaming machine 200 suitable for implementation of the present invention. Machine 200 includes a main cabinet 204, which generally surrounds the machine interior (not shown) and is viewable by users. The main cabinet includes a main door 208 on the front of the machine, which opens to provide access to the interior of the machine. Attached to the main door are player-input switches or buttons 232, a coin acceptor 228, and a bill validator 230, a coin tray 238, and a belly glass 240. Viewable through the main door is a video display monitor 234 and an information panel 236. The display monitor 234 will typically be a cathode ray tube, high resolution flat-panel LCD, or other conventional electronically controlled video monitor. The information panel 236 may be a back-lit, silk screened glass panel with lettering to indicate general game information including, for example, the number of coins played. The bill validator 230, player-input switches 232, video display monitor 234, and information panel are devices used to play a game on the game machine 202. The devices are controlled by circuitry (not shown) housed inside the main cabinet 204 of the machine 200. Many possible games, including traditional slot games, video slot games, video poker, and video keno, may be provided with gaming machines of this invention.

The gaming machine 200 includes a top box 206, which sits on top of the main cabinet 204. The top box 206 houses a number of devices, which may be used to add features to a game being played on the gaming machine 200, including speakers 210, 212, 214, a ticket printer 218 which may print bar-coded tickets 220, a key pad 222 for entering player tracking information, a florescent display 216 for displaying player tracking information, a card reader 224 for entering a magnetic striped card containing player tracking information. Further, the top box 206 may house different or additional devices than shown in FIG. 1. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 204 of the machine 200.

Understand that gaming machine 200 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 1, when a user wishes to play the gaming machine 200, he or she inserts cash or cash tokens through the coin acceptor 228 or bill validator 230. In addition, the player may use a cashless instrument of some type to register credits on the gaming machine 200. For example, the bill validator 230 may accept a printed cashable, restricted (e.g., non-cashable) or combination ticket voucher, including 220, as an indicia of credit. The credits are preferably, but not necessarily, accounted for in the lowest common denominator of the currency accepted by the gaming machine (e.g., pennies for US dollars). As another example, the card reader 224 may accept a debit card or a smart card containing cash or credit information that may be used to register credits on the gaming machine. Typically, the information contained on the cashless instrument, including the ticket voucher, smart card or debit card, is validated by a cashless system. The cashless instrument, including the ticket voucher, smart card or debit card, may have been generated at the same property, for example a first casino where the gaming machine 200 is located or the ticket may have been generated at another property for example a second casino.

The cashless instrument typically contains information used to register credits on the gaming machine, including gaming machine 200, and validate the registration transaction. For example, when a ticket voucher is used as a cashless instrument, the printed ticket voucher may contain information including: 1) a ticket value, 2) a ticket issue date, 3) a ticket issue time, 4) a ticket transaction number, 5) a machine ID, 6) a ticket issue location, 7) a ticket owner, and 8) a ticket type (e.g., cashable, restricted or combination). Information such as the ticket type, ticket value, the ticket issue date, the ticket issue time, the ticket number and the machine ID may be common to cashless systems that generate and validate tickets issued at a single property. However, information such as the ticket issue location and the ticket owner may be needed to allow multi-site generation and validation of cashless instruments. In addition, other types of information, besides the information listed above, may be stored on the cashless instrument. For example, the ticket may contain information regarding a promotional prize that may be won by the player when the ticket voucher is utilized in the gaming machine 200. The promotional prize may involve multiple properties and particular types of gaming machines and/or host systems.

The information on the cashless instrument may be recorded on the cashless instrument when the cashless instrument is generated. For example, in the case of the ticket voucher, the generation of the ticket voucher may refer to the actual printing of the ticket voucher on paper or some other medium. A unique bar-code may be printed on the ticket voucher which may be read with a bar-code scanner to obtain information from the ticket. The ticket voucher, including 220, may be printed from a printer, including printer 218. In the case of the smart card or debit card, the generation of the smart card or debit card refers to storing or encoding this information on the smart card or debit card. The generation of the debit card or smart card may occur when the smart card or debit card is inserted into the card reader 224 in the gaming machine 200 or at another site where smart cards or debit cards are issued. For example, smart cards or debit cards may be generated at ATM-like terminals, at a cashier station when a player cashes out or prepaid smart cards or debits may be purchased within the gaming property (e.g. casino). Smart cards may distinguish between types of stored credit (e.g., cashable vs. restricted), and may carry credit information for multiple types of credit at the same time.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 232, the video display screen 234 or using some other device which enables a player to input information into the gaming machine. During certain game events, the gaming machine 200 may display visual and auditory effects that can be perceived by the player. These effects add to the excitement of a game, which makes a player more likely to continue playing. Auditory effects include various sounds that are projected by the speakers 210, 212, 214. Visual effects include flashing lights, strobing lights or other patterns displayed from lights on the gaming machine 200 or from lights behind the belly glass 240.

After the player has completed a game, a cashless instrument may be generated at the gaming machine 200. The cashless instrument may be a printed ticket voucher, a smart card, debit card or other cashless medium. For example, the player may decide to cashout and may receive the ticket 220 from the printer 218, which may be used for further games or to redeem a cash prize where the ticket is cashable. Further, the player may receive a ticket 220 for food, merchandise, game services or other promotions from the printer 218 that may be used at the gaming property where the gaming machine is located or at other gaming properties. The player may view cashless instrument transaction information on the video display screen 234 or the florescent screen 216. For instance, when a player cashes out from the gaming machine, the value stored on the cashless instrument may be displayed using the video display 234. The gaming machine may display to the player the number of restricted credits separately or as a sum with cashable credits.

A gaming machine in accordance with the present invention is further described with reference to FIG. 2. FIG. 2 is a block diagram of a number of gaming machines connected to servers providing associated services, such as accounting and player tracking. In casino 150, gaming machines 100, 101, 102 and 103 are connected, via the data collection unit (DCU) 106 to the player tracking/accounting server 120. The DCU 106, which may be connected to up to 132 player tracking units as part of a local network in a particular example, consolidates the information gathered from player tracking units in gaming machines 100, 101, 102 and 103 and forwards the information to the player tracking/accounting server 120. Among the functions of the player tracking/accounting server are 1) to store player tracking account information, such as information regarding a player's previous game play, and 2) to calculate player tracking points based on a player's game play that may be used as basis for providing rewards to the player. Details of player tracking units with peripheral devices operated by a master gaming controller are described in co-pending U.S. patent application Ser. No. 09/838,033, filed Apr. 19, 2001, by Criss-Puskiewicz, et al, titled "Universal Player Tracking System," which is incorporated herein in its entirety and for all purposes and co-pending U.S. patent application Ser. No. 09/642,192, filed Aug. 18, 2000, by LeMay, et al, titled "Gaming Machine Virtual Player Tracking Services," which is incorporated herein in its entirety and for all purposes.

In gaming machine 100 of casino 150, an intelligent device, such as a master gaming controller 104, controls various combinations of devices that allow a player to play a game on the gaming machine and also encourage game play on the gaming machine, etc. The present invention may be implemented in logic used in the design and/or configuration of a gaming machine, including a master gaming controller (or other intelligent device in a gaming machine network such as a host server, CVT, etc.), to enable a gaming machine to accomplish the functions required by the invention including distinguishing between and handling different credit types during cash in, play (wagering and wins) and cash out phases of a gaming session, and implementing a pay schedule to determine restricted winnings, as described further below with reference to FIG. 4. The logic may be stored in a memory in the gaming machine, connected with the master gaming controller 104 or other intelligent device.

The gaming machine 100 may display to the player the number of restricted credits separately or as a sum with other types of credit during a gaming session via one or more display devices and methods. The credit and credit type information may be presented to the player in a variety of ways that are meaningful in relation to their wagering. For example, the values may be expressed as cash (in one or more currency denominations) instead of, or in addition to, credits. In such an embodiment, the cash value of restricted credits may be displayed as having one value for wagering and a different value (or none at all, depending on the type of restricted credit) for cash out. The application of a wager, including the credit composition of the wager, is controlled by logic of the individual machine and/or, where the machine is connected to a system, the host.

The master gaming controller 104 is connected with a main, usually video, display 108, and with the machine's other gaming devices which are mounted within a main cabinet 118 of the gaming machine 100. A player tracking unit 107 may be connected to the master gaming controller 104 via a slot machine interface board (SMIB) 105. The machine 100 also includes a ticket printer 117 connected to the master gaming controller 104 and/or the player tracking unit 107 as a peripheral device. The printer may print bar-coded tickets or vouchers, etc. A top box 119 is mounted on top of the main cabinet 118 of the gaming machine. In many types of gaming machines, the player tracking unit is mounted within the top box 119. Communication between the master gaming controller and the machine's various gaming devices and the a host system is via a main communication board 110.

A typical player tracking unit 107 includes a variety of player tracking devices, such as a card reader 124, a key pad 122, and a display 116, usually fluorescent, all mounted within the unit. Of course, other player tracking devices may also be used. The player tracking devices are used to input player tracking information that is needed to implement the player tracking program. The player tracking unit 107 communicates with the player tracking server via the SMIB 105, a main communication board 110 and the data collection unit 106. The SMIB 105 allows the player tracking unit 107 to gather information from the gaming machine 100 such as an amount a player has wagered during a game play session. This information may be used by the player tracking application(s) running on a host system including server 120 to calculate player tracking points for the player. The player tracking unit 107 is usually connected to the master gaming controller 104 via a serial connection of some type and communicates with the master gaming controller 104 using a communication protocol(s) of some type. For example, the master gaming controller 104 may employ the Slot Accounting System (SAS protocol) developed by International Game Technology of Reno, Nev. to communicate with the player tracking unit 107. SAS can operate with multiple channels to communicate with other systems such as IGT's EZ PAY servers or CVTs, etc.

FIG. 3 is a block diagram of the components of a cashless gaming system, such as the EZ PAY ticket voucher system (IGT, Reno, Nev.), suitable for implementation of the present invention. A cashless system is the hardware components and software components needed to generate and validate cashless instruments. Components of an cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ PAY ticket voucher system. Typically, a cashless system is installed at each property utilizing cashless instruments. To allow multi-site validations of cashless instruments, the cashless systems at each property may be linked to a cashless instrument transaction clearinghouse, such as described in co-pending U.S. patent application Ser. No. 09/648,382, filed Aug. 25, 2000, by Rowe, titled "Cashless Transaction Clearinghouse," which is incorporated herein in its entirety and for all purposes. The details of a cashless system at one property are described below with reference to FIG. 3.

Returning to FIG. 3, a first group of gaming machines, 65, 66, 67, 68, and 69 is shown connected to a first clerk validation terminal (CVT) 60 and a second group of gaming machines, 75, 76, 77, 78 and 79 is shown connected to a second CVT 70. All of the gaming machines print ticket vouchers which may be exchanged for cash or accepted as credit of indicia in other gaming machine located within the property 5. In this example, the ticket voucher serves as a cashless instrument. In addition, the gaming machines may accept ticket vouchers issued at a different property from property 5 where the different property utilizes a compatible cashless system.

When the CVTs are not connected to one another, a ticket voucher printed from one gaming machine may be only be used as indicia of credit in another gaming machine which is in a group of gaming machines connected to the same clerk validation terminal. For example, a ticket voucher printed from gaming machine 65 might be used as credit of indicia in gaming machines 66, 67, 68 and 69, which are each connected to the CVT 60, but not in gaming machines 75, 76, 77, 78, and 79, which are each connected to the CVT 70. In an analogous manner, when the cashless systems from one property are not connected together then a ticket vouchers generated from gaming machine 66 may be not be used at property different from property 5.

The CVTs, 60 and 70, store cashless instrument transaction information corresponding to the outstanding cashless instrument, including ticket vouchers, smart cards and debit cards, that are waiting for redemption. In this embodiment, the CVTs are separate from the gaming machine. However, the cashless instrument information may be also be stored within each gaming machine or one gaming machine may functionally act as a CVT for a group of gaming machines eliminating the separate CVT hardware. In addition, cashless instrument transaction information may be stored in a cashless server including the server 10. The cashless instrument transaction information may be used when the tickets are validated and cashed out or redeemed in some other manner. The CVTs 60 and 70 may store the information for the ticket vouchers printed by the gaming machines connected to the CVT. For example, CVT 60 stores ticket voucher information for ticket vouchers printed by gaming machines 65, 66, 67, 68, and 69. When a ticket is printed out, ticket information is sent to the CVT using a communication protocol of some type from the gaming machine. For example, the gaming machine may send transaction information to the CVT which is part of the cashless system using the slot data system manufactured by Bally's Gaming Systems (Alliance Gaming Corporation, Las Vegas, Nev.) or the slot acquisition system manufacture by IGT, Reno, Nev.

In this embodiment, when a player wishes to cash out a ticket, the player may redeem vouchers printed from a particular gaming machine at the CVT associated with the gaming machine or any other CVT which is part of the cashless system associated with the CVT. For example, since CVT 60 and CVT 70 are connected as part of a single cashless system to the server 10, a player may redeem vouchers or utilize vouchers at the gaming machines, the CVT's (60 or 70), the cashiers (25, 30, 35, and 40) or the wireless cashiers 58. The CVTs, cashiers, wirelss cashiers and gaming machines may be referred to as "cashless validation sites." To cash out the ticket voucher, the ticket voucher is validated by comparing information obtained from the ticket with information stored within the CVT. After a ticket voucher has been cashed out, the CVT marks the ticket paid in a database to prevent a ticket voucher with similar information from being cashed multiple times.

The topology of such cashless gaming systems may vary dramatically depending on implementation, but the primary functions are similar. For example, not all cashless systems may utilize CVTs. Many of the functions of the CVT may be transferred to a cashless gaming system server, including the server 10, eliminating the function within the CVT. For instance, the cashless instrument transaction information may be stored in the cashless server instead of the CVT. Thus, the need to store cashless instrument transaction information within the CVT may be eliminated.

In this embodiment of a cashless system, multiple groups of gaming machines connected to CVTs are connected together in a cross validation network 45. The cross validation network is typically comprised of one or more concentrators 55 which accepts inputs from two or more CVTs and enables communications to and from the two or more CVTs using one communication line. The concentrator is connected to a front end controller 50 which may poll the CVTs for ticket voucher information. The front end controller is connected to a server 10 which may provide a variety of information services for the award ticket system including accounting 20 and administration 15.

The cross validation network allows ticket vouchers generated by any gaming machine connected to the cross validation to be accepted by other gaming machines in the cross validation network 45. Additionally, the cross validation network allows a cashier at a cashier station 25, 30, and 35 to validate any ticket voucher generated from a gaming machine within the cross validation network 45. To cash out a ticket voucher, a player may present a ticket voucher at one of the cashier stations 25, 30, and 35 or to a game service representative carrying a wireless gaming device for validating ticket vouchers. A more complete discussion of the details of the wireless gaming device 58, including hardware and utilization, are described in copending U.S. patent application Ser. No. 09/544,844 entitled "A Wireless Game Environment" filed Apr. 7, 2000 by Rowe the entire specification of which is incorporated herein by reference.

As tickets are validated, this information may be sent to audit services computer 40 providing audit services, the accounting computer 20 providing accounting services or the administration computer 15 providing administration services. In another embodiment, all of these services may be provided by the cashless server including the EZ PAY server 10. Examples of auditing services, which may be provided by cashless system software residing on the auditing computer 40 include 1) session reconciliation reports, 2) soft count reports, 3) soft count verification reports, 4) soft count exception reports, 5) machine ticket status reports and 5) security access report. Examples of accounting services, which may be provided by cashless system software residing on the accounting computer 20 include 1) ticket issuance reports, 2) ticket liability reports, expired ticket reports, 3) expired ticket paid reports and 4) ticket redemption reports. Examples of administration services, which may be provided by cashless system software residing on the administration computer 15 include 1) manual ticket receipt, 2) manual ticket report, 3) ticket validation report, 4) interim validation report, 5) validation window closer report, 6) voided ticket receipt and 7) voided ticket report.

Restricted Wins

The present invention provides a gaming system and method enabling wins of restricted credits, supplementing current gaming systems and methods which generate cashable credits from winning game play. As used herein, the terms "cashable" and restricted have their current normal and accepted meaning in the gaming industry: "Cashable" credits are directly redeemable for cash for the fill face value of the cashless gaming instrument (e.g., ticket or voucher). "Restricted" credits have restrictions applied and are not directly redeemable for cash for the full face value of the cashless gaming instrument. Restricted credits may be, for example, non-cashable, that is, not redeemable for cash, but only playable on a gaming machine that supports the cashless system in which the instrument (voucher) was issued. Such restricted credits are commonly referred to as "promotional credits." There are also other types of restricted credits, as discussed above. A "win" is an award of credits based on the outcome of a wagering game.

Figure 4:
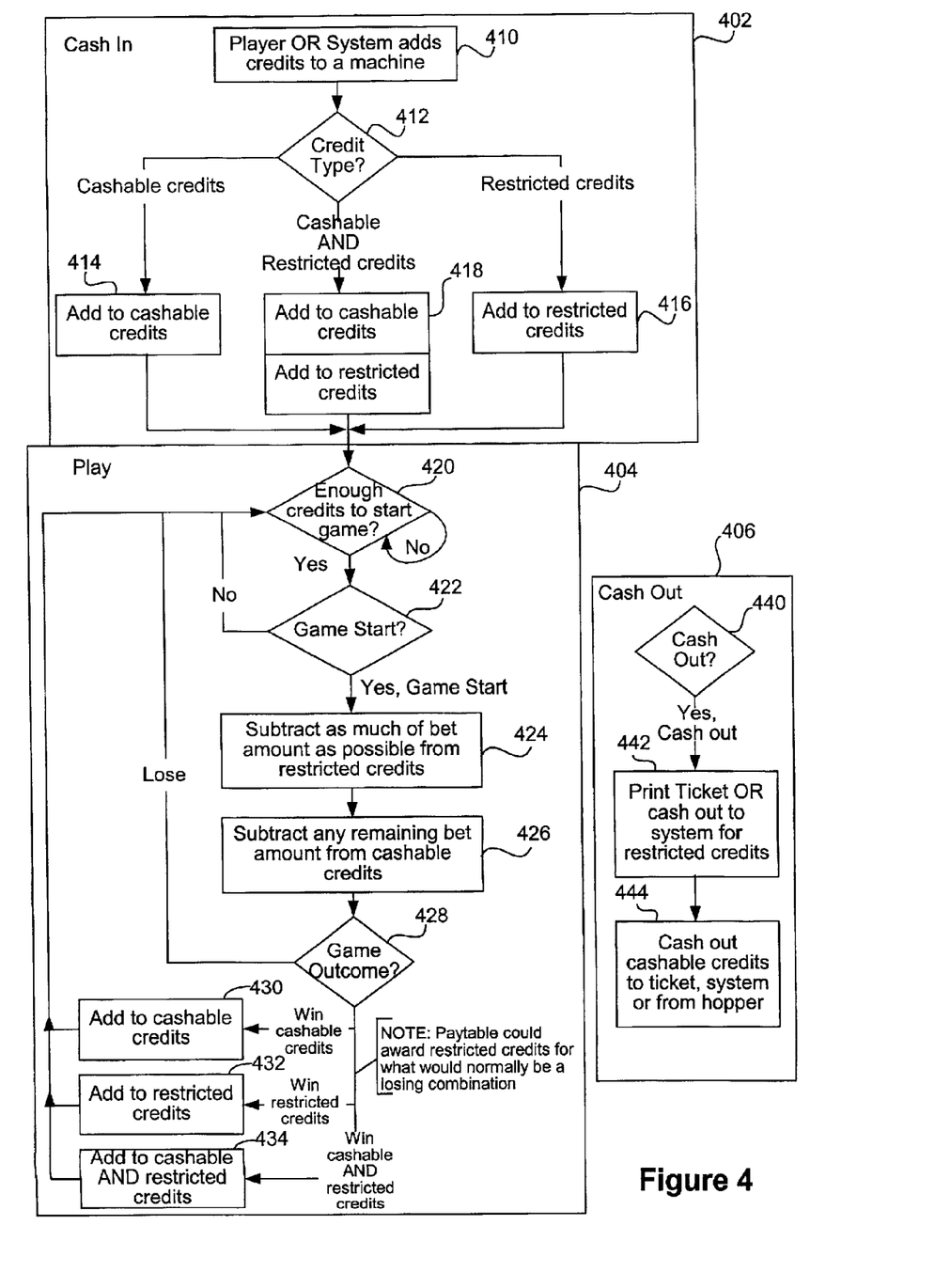
FIG. 4 is a flow chart depicting a method of providing wins of restricted credits in accordance with the present invention.

FIG. 4 is a flow chart depicting a method of providing wins of restricted credits in accordance with the present invention. The flow chart 400 is depicted as three loosely coupled threads, Cash In 402, Play 404, and Cash Out 406, each representing a distinct phase of a gaming session. In each of these threads, credit handling is required. A playing session is initiated on a machine by adding playing credit to the machine in the Cash In thread 402. In 410, credit may be added by the player adding credits to the machine in any form accepted by the machine, for example, bills, coins or vouchers. Credit may be added via an input mechanism designed or configured to receive player credit instruments, and distinguish and store player credit type and amount. In addition, the gaming machine or system may add credits to the machine for the player, for example, as a promotion. Thus, the invention allows a gaming machine operator to obtain the benefits of offering restricted credits without the need for the gaming machine to be connected to a host system (capable of EFT).

At 412, the type of credit added to the machine is determined. The credit type may be determined by the device accepting the credit. In one embodiment, a bill validator accepting a ticket or voucher is designed or configured (e.g., through logic stored in a memory associated with the device) to recognize a code indicating credit type printed or otherwise stored on the ticket or voucher. Other devices accepting credit can be designed or configured to function in this way, for example, coin acceptors may recognize tokens with no cash value but worth restricted credits when inserted into the machine. Alternatively, a host system may provide credits to a machine via EFT, indicating the type of credit provided. Credit types include cashable credits, restricted credits (of one or more types), and a combination of the cashable and restricted credits. At 414, 416 and 418, the added credits are summed with any pre-existing player credits in the machine according to type.

The gaming machine may display to the player the number of restricted credits separately or as a sum with other types of credit during a gaming session via one or more display devices and methods. The credit and credit type information may be presented to the player in a variety of ways that are meaningful in relation to their wagering or cash out options. For example, the values may be expressed as cash (in one or more currency denominations) instead of, or in addition to, credits. In such an embodiment, the cash value of restricted credits may be displayed as having one value for wagering and a different value (e.g., a discount of the face value), or none at all, depending on the type of restricted credit, for cash out. In some embodiments, the player may be presented with cash out options for their restricted credits that include the purchase of merchandise which is displayed on the machine, or the conversion of their restricted credits to cashable credits (e.g., at a discount of the face value).

From the Cash In thread 402, the payer has a choice of playing or cashing out. If the player chooses to play, credit handling is governed by the Play (including wagering and wins) thread 404. At 420, it is determined whether or not their are enough credits in the machine to start a game. Part of starting the game is making a wager, and the player must have sufficient credit in the machine to cover a wager made. If not, game playing cannot begin without the addition of further credits or reduction of the wager to a valid amount, that it, an amount covered by the available credits. The machine will wait until further credits are added or a valid amount is wagered, or the gaming session is terminated, for example, by a cash out event. It should be understood that a player may cash out at any point before or between games, such as by pushing a cash out button on the gaming machine.

If there are enough credits to start a game, it is determined whether or not the player has started the game at 422. If the player has started a game, including making a wager, the wagered amount possible is subtracted from the player's credit total. In one embodiment, depicted in FIG. 4, as much of the wagered amount as possible is subtracted from the player's restricted credit total at 424. Any remaining wagered amount beyond that available from restricted credits is subtracted from the player's cashable credits at 426. Alternate selection of credit type for wagering may also be allowed. The application of a wager, including the credit composition of the wager, is controlled by logic of the individual machine and/or, where the machine is connected to a system, the host.

The game is then played and the outcome determined at 428. If the game outcome is a loss, the flow returns to 420 to determine if there are enough credits to start another game. If the game outcome is a win, payout schedules can specify win combinations that result in wins of cashable credits, restricted credits or a mixture of different types of credits. In each case, the wins are added to the corresponding credit types at 430, 432 and 434, and the flow returns to 420 to determine if there are enough credits to start another game.

In accordance with the present invention, payout schedules that result in wins of restricted credits can be based on a variety of factors including game plays and outcomes that might otherwise be losses or have no impact on winnings. Examples of restricted credit pay schedule factors include amount wagered, winning streaks, losing streaks, time played, host system input, near misses, or any number of other methods. Once restricted credits are awarded to a player, the gaming machine will use these wins of restricted credits towards additional wagers made by the player. The gaming machine will not allow a player to directly redeem restricted credits as cash. However, depending upon the type of restricted credits a player has, the player may redeem the credits for cash at a discount value, for example, or transfer restricted credits from one machine to another via EFT (i.e., through a system cash out) or with a printed ticket or restricted credit tokens dispensed by the machine, provided the host system connected to the gaming machine supports this type of credit transfer.

Restricted credits may also be paid based on a game pay table when certain conditions are met. For example, a player may be offered a bonus (e.g., each win is enhanced by an extra 10% payout of restricted credits) for using a player tracking or loyalty system.

As noted, the Cash Out thread 406 may be invoked at any point before or between games, such as by the player pushing a cash out button on the gaming machine. Determination of whether a cash out has been requested is made at 440. If so, cash out may occur in a variety of ways. For restricted credits, a ticket or voucher may be printed by the machine with the amount of credits in the machine at the time at 442. To accomplish this, a memory storing logic may cause the master gaming controller (or other intelligent device) to award a voucher with wins of restricted credit to the player based on the game outcome. The voucher may be dispensed via an output mechanism designed or configured to store restricted credit winning information to a restricted credit instrument. Alternatively, where the player is registered with the system there may be a cash out (via EFT) to the gaming machine system with the restricted credits going into the players restricted credit account. Similarly, where the credits in the machine include cashable credits, they may be cashed out by printing to a ticket or voucher, to the system or by a dispensation of cash from the hopper, at 444. The machine may also print vouchers that represent more than one type of credit (e.g., restricted and cashable) on the same instrument. A single cash out operation may direct restricted and cashable credits to different output devices (e.g., restricted to printer to generate a voucher and cashable to hopper to dispense cash. Of course, other cash-out devices, as are known in the art, may also be used. It should also be understood that the invention may be implemented on a machine with no cash out devices where, for example, wins are provided in the form of restricted credit vouchers.

Restricted credit wins may be awarded according to the same or a different pay table as cashable credits on the same machine or at the same gaming property. Where separate pay tables are used for restricted and cashable credits, the invention may be implemented with a machine that pays restricted credits according to an evaluation mechanism associated with one fixed internal pay table and cashable credits according to another fixed internal pay table. Alternatively, a machine may pay restricted credit wins according to an external pay table provided by a host system to which the machine is connected having an evaluation mechanism that pays wins based on other factors, such as overall winning percentage at all machines on a system, player loyalty, chance bonus, loss streak, close, or other host system direction (i.e., the host system determines the game outcome and passes the result to the machine).

In one embodiment of the present invention, wins may be paid out according to a pay table or tables capable of paying out different amounts of credits depending on if paid in cashable or restricted credits. That is, for example, wins may be determined according to a different payout schedule where they are paid out in restricted credits (all or in part) rather than cashable credits. So, for example, a pay table with different winning odds may be used for awarding wins of restricted credits. Or restricted credit may be awarded from a subset of win categories (e.g., having higher odds) of a given pay table also used to award cashable wins (e.g., award cashable credits for wins for royal flush, but restricted credits for wins for a pair). The latter may have the effect of giving better odds while reducing the chance of earlier player cash outs. The restricted credit win pay schedule may give the player higher odds of winning, since according to the statistical averages used to compute pay tables, the amount of cashable credits ultimately likely to be won from wagers of restricted credits are less than the equivalent cash value of the restricted credits. In this way, the invention allows for pay schedules that can return a higher percentage to the player (where the wins include at least in part restricted credits), thereby encouraging further play, without increasing the financial liability for the gaming machine operator.

Some further examples of ways in which restricted wins may be paid out in accordance with this invention include paying a percentage cashable wins as extra wins of restricted credit, consolation prizes for extended losses, particular win categories, rewards for player loyalty or duration of play, progressive awards, or system-wide bonuses.

The preceding contemplates a gaming machine which accepts both cashable and restricted credits. In another embodiment, the invention may be implemented with a machine that accepts and pays only restricted credit according to a single, fixed internal payout schedule ("pay table"). For example, such a machine might be in a "learners" area of a casino that allows for a player to practice on a particular machine at higher odds for restricted credit before playing on machine offering the chance of cashable wins, but at lower odds. Again, for the same reasons noted above, the odds of winning on such a machine could be higher than on other machines in the casino paying only cashable wins without increasing the financial liability of the casino owner.

Conclusion

The present invention provides a gaming system and method capable of providing wins of restricted credits. Among the advantages of the present invention are that it facilitates the awarding of restricted credits which are known to encourage further play. In some implementations, it also allows for pay schedules that can return a higher percentage to the player, thereby encouraging further play, without increasing the financial liability for the gaming machine operator. Also, in some implementations, the gaming machine internally accounts for different credit types so that the invention allows a gaming machine operator to obtain the benefits of offering restricted credits whether or not the gaming machine is connected to a host system (capable of EFT).

Although the foregoing invention has been described in some detail for purposes of clarity of understanding, it will be apparent that certain changes and modifications may be practiced within the scope of the appended claims. It should be noted that there are many alternative ways of implementing both the method and apparatus of the present invention. For instance, while the gaming machines of this invention have been depicted as having top box mounted on top of the main gaming machine cabinet, the use of gaming devices in accordance with this invention is not so limited. Various alternative embodiments of the present invention may be practiced with stand-alone gaming machines or gaming machines linked by a host system. Also, restricted credits might also be awarded as a result of playing in a slot or video poker tournament. Accordingly, the present embodiments are to be considered as illustrative and not restrictive, and the invention is not to be limited to the details given herein, but may be modified within the scope and equivalents of the appended claims.

What is claimed is:

1. A gaming machine, comprising:
   a housing;
   a master gaming controller residing within the housing designed or configured to control a game of chance played on the gaming machine and to distinguish between two types of credits, cashable credits and restricted credits, wherein each game of chance comprises:
      a) receiving a wager, comprising an amount of at least one of the restricted credits, the cashable credits or combinations thereof, on a game outcome for the game of chance, b) determining the game outcome for the game of chance, c) determining an award corresponding to the game outcome using a pay table that specifies the award for each possible game outcome for the game of chance wherein at least one award is an amount of the restricted credits and d) displaying the game outcome for the game of chance and the determined award corresponding to the game outcome wherein awarded restricted credits are stored on the gaming machine and available for wagers on subsequent games of chance until cashed out; and
   a display device for displaying the outcome of the game of chance.

2. The gaming machine of claim 1, wherein the restricted credits are non-cashable.

3. The gaming machine of claim 1, further comprising an input mechanism designed or configured to receive player credit instruments, and distinguish and store player credit type and amount.

4. The gaming machine of claim 1, further comprising an output mechanism designed or configured to store restricted credit winnings information to a cashless instrument.

5. The gaming machine of claim 4, wherein said cashless instrument stores the restricted credit in combination with the cashable credit.

6. The gaming machine of claim 1, wherein said gaming machine is a stand-alone machine.

7. The gaming machine of claim 1, wherein said gaming machine is interconnected with other machines via a server in a gaming machine system.

8. The gaming machine of claim 1, further comprising at least one of a printer, a ticket acceptor and a card reader connected with said master gaming controller.

9. The gaming machine of claim 1, wherein the master gaming controller is further designed or configured to award the wins of restricted credits to the player based upon one or more of a percentage of cashable wins, an amount lost, a duration of play, a progressive award, a system-wide bonus, an amount wagered, a winning streak, a losing streak, a host system input and a near miss.

10. The gaming machine of claim 1, wherein said gaming machine is a further designed or configured to also provide wins of the cashable credits as one of the awards.

11. The gaming machine of claim 10, wherein the gaming machine is further designed or configured to pay out different amounts of credit for a given win depending on if paid in said cashable credits or said restricted credits.

12. The gaming machine of claim 11, wherein the amounts of credit for the given win are specified in a pay table internal to the machine.

13. The gaming machine of claim 11, wherein the amounts of credit for the given win are specified in a host system pay table that is external to the machine.

14. The gaming machine of claim 1, wherein said gaming machine is a designed or configured to provide wins of only restricted credits.

15. In a gaming machine, a method of awarding wins of restricted credit, comprising:

receiving a wager, comprising an amount of at least one of the restricted credits, cashable credits or combinations thereof, on a game outcome for the game of chance wherein the gaming machine is operable to distinguish between two types of credits, cashable credits and restricted credits;

determining the game outcome for the game of chance;

determining an award corresponding to the game outcome using a pay table that specifies the award for each possible game outcome for the game of chance wherein at least one award is an amount of the restricted credits and displaying the game outcome for the game of chance and the determined award corresponding to the game outcome wherein awarded restricted credits are stored on the gaming machine and available for wagers on subsequent games of chance until cashed out.

16. The method of claim 15, wherein the restricted credits are non-cashable.

17. The method of claim 15, wherein the restricted credit winnings are calculated according to a fixed internal pay table.

18. The method of claim 15, wherein the restricted credit winnings are calculated according to an external pay table.

19. The method of claim 18, wherein the external pay table determines game outcome based on a pay table of at least one of a bonus award, a progressive award, losing streak, player loyalty, duration of play and host system direction.

20. The method of claim 15, further comprising awarding wins of restricted credit to a player based upon one or more of a percentage of cashable wins, an amount lost, a duration of play, a progressive award, a system-wide bonus, an amount wagered, a winning streak, a losing streak, a host system input and a near miss.

21. The method of 15, further comprising awarding wins of the cashable credits based on game outcome.

22. The method of claim 15, wherein said gaming machine is a stand-alone machine.

23. The method of claim 15, wherein said gaming machine is a interconnected with other machines via a server in a gaming machine system.

24. The method of claim 15, wherein the wager comprises restricted credits.

25. The method of claim 15, further comprising displaying on the machine available credits by credit type.

26. The method of claim 25, further comprising displaying on the machine available credits in one or more cash denominations.

27. The gaming machine of claim 15, further comprising converting restricted credit winnings to cash at a discount of face value.

28. The gaming machine of claim 15, further comprising converting restricted credit winnings to the cashable credits at a discount of face value.

29. The gaming machine of claim 15, further comprising converting restricted credit winnings to merchandise.

* * * * *